United States Patent
Blaszyk et al.

(10) Patent No.: US 6,324,872 B1
(45) Date of Patent: Dec. 4, 2001

(54) METHOD AND APPARATUS FOR INTRODUCING CONTROLLED SPIN IN OPTICAL FIBERS

(75) Inventors: Paul E. Blaszyk, Horseheads; William R. Christoff, Elmira; Daniel E. Gallagher, Big Flats, all of NY (US); Robert M. Hawk, Pawleys Island, SC (US); William J. Kiefer, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 08/838,836

(22) Filed: Apr. 11, 1997

Related U.S. Application Data
(60) Provisional application No. 60/015,298, filed on Apr. 12, 1996.

(51) Int. Cl.$^7$ ............................ C03B 37/075; D01H 1/11
(52) U.S. Cl. ................ 65/504; 57/293; 57/334; 57/335; 57/336; 65/402
(58) Field of Search .............. 65/402, 504; 57/293, 57/334, 335, 336

(56) References Cited

U.S. PATENT DOCUMENTS

| | | | |
|---|---|---|---|
| 2,577,793 | * 12/1951 | Miller ............................... | 57/335 |
| 3,377,792 | * 4/1968 | Walls et al. ........................ | 57/335 |
| 3,659,408 | * 5/1972 | Burr ................................. | 57/293 |
| 3,714,771 | * 2/1973 | Henshaw et al. .................. | 57/335 |
| 3,807,160 | * 4/1974 | Pearce et al. ...................... | 57/335 |
| 4,144,700 | 3/1979 | Takai et al. ........................ | 57/264 |
| 4,248,035 | 2/1981 | Skillen et al. ..................... | 57/6 |
| 4,308,045 | 12/1981 | Miller ............................... | 65/403 |
| 4,377,932 | 3/1983 | Dammann et al. ................. | 57/336 |
| 4,509,968 | 4/1985 | Arditty et al. ..................... | 65/500 |
| 5,298,047 | 3/1994 | Hart, Jr. et al. ................... | 65/432 |
| 5,418,881 | * 5/1995 | Hart, Jr. et al. ................... | 385/123 |
| 5,897,680 | 4/1999 | Geertman .......................... | 65/402 |

FOREIGN PATENT DOCUMENTS

| | | |
|---|---|---|
| 2555337 | 7/1980 | (DE) . |
| 3022088 | 12/1981 | (DE) . |
| 0 729 919 A | 9/1996 | (EP) . |
| 0 744 636 A | 11/1996 | (EP) . |
| 2359087 | 2/1978 | (FR) . |
| WO 8300232 | 1/1983 | (WO) . |
| 97 07067 A | 2/1997 | (WO) . |
| 97 22897 A | 6/1997 | (WO) . |
| 97 30945 A | 8/1997 | (WO) . |

OTHER PUBLICATIONS

H. Schneider et al., "Low–birefringence single–mode optical fibers: preparation and polarization characteristics", Applied Optics, vol. 17, No. 19, pp. 3035–3037. (Oct. 1978).

MJ Marrone et al., "Internal rotation of the birefringence axes in polarization–holding fibers", Optics Letters, vol. 12, No. 1, pp. 60–62. (Jan. 1987).

R. Ulrich et al., "Polarization optics of twisted single–mode fibers", Applied Optics, vol. 18, No. 13, pp. 2241–2251. (Jul. 1979).

SC Rashleigh, "Fabrication of Circularly Birefringent Single Mode Fibers", Navy Technical Disclosure Bulletin, vol. 5, No. 12, pp. 7–12. (Dec. 1980).

* cited by examiner

Primary Examiner—Sean Vincent
(74) Attorney, Agent, or Firm—William J. Chervenak; Timothy R. Krogh; Randall S. Wayland

(57) ABSTRACT

Optical fiber is provided with a periodically reversing spin while the fiber is pulled through a melt zone. A cooled region of the fiber downstream from the melt zone passes between a pair of opposed elements. The opposed elements are moved so that surface regions engaging the fiber move in opposite lateral directions relative to one another, thus spinning the fiber about its axis. The lateral movement of the engaged surface portions is periodically reversed to reverse the spin direction. The opposed elements may include belts or rollers, which can be tilted to orientations oblique to the longitudinal direction of the fiber.

16 Claims, 5 Drawing Sheets

METHOD AND APPARATUS FOR INTRODUCING CONTROLLED SPIN IN OPTICAL FIBERS

RELATED APPLICATIONS

This application claims priority to and the benefit of U.S. provisional application No. 60/015,298 filed on Apr. 12, 1996.

BACKGROUND OF THE INVENTION

The present invention relates to the manufacture of optical fibers.

Optical fiber used in communication systems typically includes a core of glass surrounded by a cladding also formed from glass having different optical properties from the core. The fiber typically is covered with a protective outer coating. Such fibers can be made by drawing a thin strand from a heated, partially molten preform formed from glass having the correct composition to make the core surrounded by a layer of glass having the appropriate composition to make the cladding. As a strand of soft, molten glass is pulled from the preform, both the core glass and the cladding glass stretch. The core remains in the middle and the cladding remains on the outside, thus forming the composite core and cladding structure of the finished fiber. As the fiber is pulled away from the preform, it cools and solidifies, and the coating is applied. These processes are performed at high speeds so that the fiber is drawn at high rates.

In operation of an optical communication system, light applied at one end of the fiber is pulsed or progressively varied in accordance with the information to be transmitted. The pulses or progressively varying light are received at the other end of the fiber. The speed at which light passes along a fiber depends upon many factors including the optical properties of the materials making up the core and cladding and, the diameter of the core. The fibers commonly used for optical data transmission systems are so-called "single mode" fibers. In these fibers, the core diameter is small enough that all of the light must pass through the core in a so-called "fundamental" or "HE11" mode of transmission. Full discussion of transmission modes in optical fibers is beyond the scope of this disclosure. However, the fundamental or HE11 mode can be regarded as propagation of light straight along the axis of the core, as opposed to higher-ordered modes which can be thought of as propagation of light in a zig-zag pattern.

In a theoretically perfect single mode fiber, because all of the light passes through the fiber in the same mode, all light of a given wavelength will pass along the length of the fiber with the same velocity. However, the light passing along the fiber typically includes portions having different polarizations, i.e., different orientation of the electromagnetic waves constituting the light. If the fiber core is not perfectly cylindrical, but instead is out of round so that it has long and short diameters, light of one polarization will have its electrical waves aligned with a long diameter of the core whereas light of the other polarization will have its electrical waves aligned with the short diameter of the core. In this case, the effective diameter of the fiber core will be different for light of one polarization than for light of another polarization. Portions of light having different polarizations will travel at different velocities. Stated another way, the fiber has a "slow" axis in one direction perpendicular to its length, and a "fast" axis in the other direction perpendicular to its length.

Light having a direction of polarization aligned with the fast axis travels more rapidly than light having a direction of polarization aligned with the slow axis. As a result, the two polarization modes propagate with different propagation constants ($\beta_1$ and $\beta_2$). The difference between the propagation constants is termed birefringence ($\Delta\beta$), the magnitude of the birefringence being given by the difference in the propagation constants of the two orthogonal modes:

$$\Delta\beta = \beta_1 - \beta_2.$$

Birefringence causes the polarization state of light propagating in the fiber to evolve periodically along the length of the fiber. The distance required for the polarization to return to its original state is the fiber beat length ($L_b$), which is inversely proportional to the fiber birefringence. In particular, the beat length Lb is given by:

$$L_b = 2\eta/\Delta\beta$$

Accordingly, fibers with more birefringence have shorter beat lengths and vice versa. Typical beat lengths observed in practice range from as short as 2–3 millimeters (a high birefringence fiber) to as long as 10–50 meters (a low birefringence fiber).

In addition to causing periodic changes in the polarization state of light traveling in a fiber, the presence of birefringence means that the two polarization modes travel at different group velocities, the difference increasing as the birefringence increases. The differential time delay between the two polarization modes is called polarization mode dispersion, or PMD. PMD causes signal distortion which is very harmful for high bit rate systems and analog communication systems.

This phenomenon is referred to in the art of fiber optic communication as polarization mode dispersion or "PMD". Imperfections in the fiber other than differences in core diameter can also contribute to PMD. PMD causes distortion of the light pulses or waves transmitted along the fiber, thus reducing the signal quality and limiting the rate at which information can be passed along the fiber.

One method of reducing the effects of PMD is to continually reorient the fast and slow axis of the fiber. This can be accomplished by spinning the fiber as it is drawn, so that the slow axis and the fast axis of the fiber are repeatedly interchanged along the length of the fiber. Thus, at one point along the length of the fiber the slow axis points in a first direction perpendicular to the length of the fiber and the fast axis points in a second direction perpendicular to the length of the fiber and perpendicular to the first direction. At another point along the length of the fiber, the fast axis points in the first direction and the slow axis points in the second direction. In a fiber with spin, the fast axis traces a generally helical path. The magnitude of the spin can be expressed as the number of turns per unit length of such helix, i.e., the number of times per unit length of fiber that the directions of the fast and slow axes interchange. The direction of the spin corresponds to the direction of the helix traced by the fast axis, either right-handed or left-handed. In a fiber with the appropriate spin, the effects caused by the fast and stow axes are substantially eliminated and all light travels with the same velocity. To provide optimum PMD suppression, it is normally desirable to vary the magnitude and direction of the spin along the length of the fiber.

Various attempts have been made to impart spin to the optical fiber during the production process discussed above. For example, as disclosed in Rashleigh, Navy Technical Disclosure Bulletin, Volume 5, Number 12, December 1980, Navy Tech. Cat. No. 4906, a twisted fiber can be prepared by rotating the preform about its axis while drawing the fiber from the preform. A similar approach, more generally stated as "continuous relative rotation between the preform and the drawn fiber" is disclosed in International Patent Publication WO 83/00232. As disclosed, for example, in U.S. Pat. No. 4,509,968, the process involving rotation of the preform leads to considerable practical disadvantages. The preform is a massive, soft object which must be maintained at a high temperature. The '968 patent, therefore, proposes to produce a helical or "chrialic" structure in the fiber by feeding the fiber through a set of nips at the cold or downstream end of the fiber drawing process while continually spinning the frame holding the nips. A complex arrangement of a frame and fiber takeup drum is used in this process to transfer the fiber from the spinning nips to the takeup drum.

Hart, Jr., et al. U.S. Pat. Nos. 5,418,881 and 5,298,047 disclose another process for making fibers with spin of alternating clockwise and counterclockwise directions. In this process, the cold end of the fiber passes around a roller while the roller rotates about an axis perpendicular to the longitudinal or upstream-to-downstream direction of the fiber. The roller is periodically moved so that the fiber tends to roll along the surface of the roller, parallel to the axis of rotation of the roller. The fiber periodically slips or jumps along the surface of the roller. Despite these and other efforts in the art, there are still needs for further improvements in processes for imparting a controlled spin to an optical fiber. In particular, there are needs for processes which can provide non-uniform spin, and particularly alternating spins in opposite directions to the fibers in a repeatable, controllable manner. There are corresponding needs for reliable, repeatable apparatus for imparting controlled spins to fibers. In particular, there are needs for methods and apparatus which can impart appreciable spin to a fiber in a repeatable manner during high speed fiber drawing, and which can be used in combination with conventional fiber drawing equipment and processes.

SUMMARY OF THE INVENTION

In view of the foregoing, it is an object of the present invention to provide improved methods and apparatus for reducing PMD. More particularly, it is an object of the invention to provide methods and apparatus for imparting spin to an optical fiber in order to reduce PMD.

One aspect of the present invention includes methods of providing spin in an optical fiber. A method according to this aspect of the invention desirably includes the step of drawing the fiber so that the fiber moves, relative to a frame of reference, downstream in a longitudinal direction from a melt zone in which the fiber is soft. The fiber solidifies during this downstream movement. The method further includes the steps of engaging the fiber with surface regions of opposed elements disposed on opposite sides of the solidified fiber downstream from the melt zone and moving these opposed elements so that surface regions of the opposed elements engaged with the fiber move with components of velocity, relative to the frame of reference in the downstream longitudinal direction. The motion is controlled so that during at least part of the drawing step, at least one of the surface regions moves relative to the frame of reference in a lateral direction transverse to the longitudinal direction of the fiber movement and so that the surface regions engaged with the fiber on opposite sides move relative to one another with opposite components of velocity in lateral directions to thereby spin the fiber. Most preferably, the moving step is conducted so that the lateral components of velocity of the surface regions relative to one another are repeatedly reversed, so that the fiber is spun repeatedly in alternating, opposite directions.

According to one aspect of the invention, the step of moving the opposed elements is performed so that the surface region on a first one of the opposed elements moves in a first surface motion direction oblique to the longitudinal direction of the fiber during at least part of the drawing step. Most preferably, the fiber is forcibly engaged with the surfaces of the opposed elements.

According to one aspect of the invention, the step of moving the first element includes the step of moving this first element around a first element axis generally transverse to the longitudinal direction so that the surface region of the first element engaged with the fiber moves perpendicular to this first element axis. For example, the first element may be a roller having a circumferential surface concentric with the first element axis, and the step of moving the first element may include the step of rotating the roller about the first element axis. The first element may also be a belt and the step of moving the first element may include the step of moving the belt around a pulley while the pulley rotates about the first element axis. In either case, the step of moving the first element axis may include the step of rocking the first element, and the first element axis, about a rocking axis transverse to the longitudinal direction of the fiber and also transverse to the aforesaid lateral directions. The rocking axis typically is perpendicular to the first element axis. The surface region of the first element may be a region on the circumferential surface of the roller or on the surface of the belt. When the first element axis rocks about the rocking axis, the direction of motion of this surface portion engaging the fiber (the "first surface motion direction") will sweep through a range of angles with respect to the longitudinal direction of the fiber. Desirably, this range extends between first and second equal but opposite extreme angles. The opposed element may be a similar belt or roller and bearing on the opposite side of the fiber, at the same point along the longitudinal direction so that the fiber is squeezed in a nip between the two opposed elements. The second element may be moved around a second element axis, and the second element may be rocked in substantially the same way about a second element rocking axis parallel to or coincident with the rocking axis associated with the first element. Thus, the second surface motion direction swept by the portion of the second element engaging the fiber also sweeps through a range of angles relative to the longitudinal direction. Desirably, the angle between the second surface motion direction and the longitudinal direction is equal but opposite to the angle between the first surface motion direction and the longitudinal direction at all times.

According to a further embodiment of the invention, the second element may include a pair of components, such as a pair of rollers, separated from one another in the longitudinal direction and defining a gap therebetween. The first and second elements are engaged with one another so that the first element is engaged in longitudinal alignment with the gap and so that the first element protrudes into the gap. The fiber is maintained under tension, as by a takeoff stand disposed downstream from the first and second elements and the tension of the fiber forces the fiber against the first and second elements. The method according to this aspect of the invention desirably includes the step of constraining the fiber against motion in the lateral directions at the components or spaced rollers of the second element. Desirably, the rollers include slotted or grooved circumferential surfaces and the fiber is engaged in such surfaces. The second element having the spaced apart components preferably does not move laterally in the fixed or equipment frame of reference. Thus, those portions of the fiber extending upstream and downstream from the first and second elements are not moved laterally during the process. In this arrangement, the surface region of the first element in contact with the fiber moves back and forth in lateral directions relative to the fixed frame of reference. In effect, the fiber rolls around its axis within the grooved surfaces of the second element.

According to yet another embodiment of the invention, the opposed elements may include a pair of rollers having axes transverse to the longitudinal direction of the fiber, or belts extending around pulleys having axes transverse to the longitudinal direction. The step of moving the opposed elements may include the step of moving each such element around its axis while simultaneously translating the elements relative to the fixed frame of reference, preferably in opposite directions.

As the fiber spins around its axis between the opposed elements, the spin is transmitted upstream along the fiber and the fiber is spun within the melt region, thereby imparting a permanent spin to each portion of the fiber. Each portion of the fiber acquires a spin corresponding to the direction of spinning motion during the time such portion of the fiber passed through the melt region and cooled. The fiber may be collected using conventional take up apparatus such as a takeup reel disposed downstream from the opposed elements. Because the spinning motion of the fiber is repeatedly reversed, the fiber is not placed under substantial torsional stress on the takeup reel. Because the fiber moves with controlled rolling motion on the elements of the apparatus, the process is repeatable and predictable. Essentially any amount of spin required for desirable optical properties and essentially any desired pattern of variation in the degree and direction of spin along the length of the fiber can be provided.

Further aspects of the invention provide fiber drawing apparatus. Apparatus according to this aspect of the invention desirably includes a structure defining a melt zone and a solid zone remote from the melt zone as well as means for drawing the fiber along a predetermined path downstream in a longitudinal direction relative to the structure so that the fiber is substantially molten in the melt zone and solidifies during drawing before reaching the solid zone. The apparatus further includes a pair of opposed elements as aforesaid disposed in the solid zone and means for forcibly engaging the opposed elements with the fiber and moving the opposed elements during operation of the fiber drawing means so that surface regions of the opposed elements move relative to one another as discussed above.

Further objects, features and advantages of the present invention will be more readily apparent from the detailed description of the preferred embodiment set forth below, taken in conjunction with the accompanying drawings.

DETAILED DESCRIPTION OF THE PREFERRED EBODIMENTS

Figure 1:
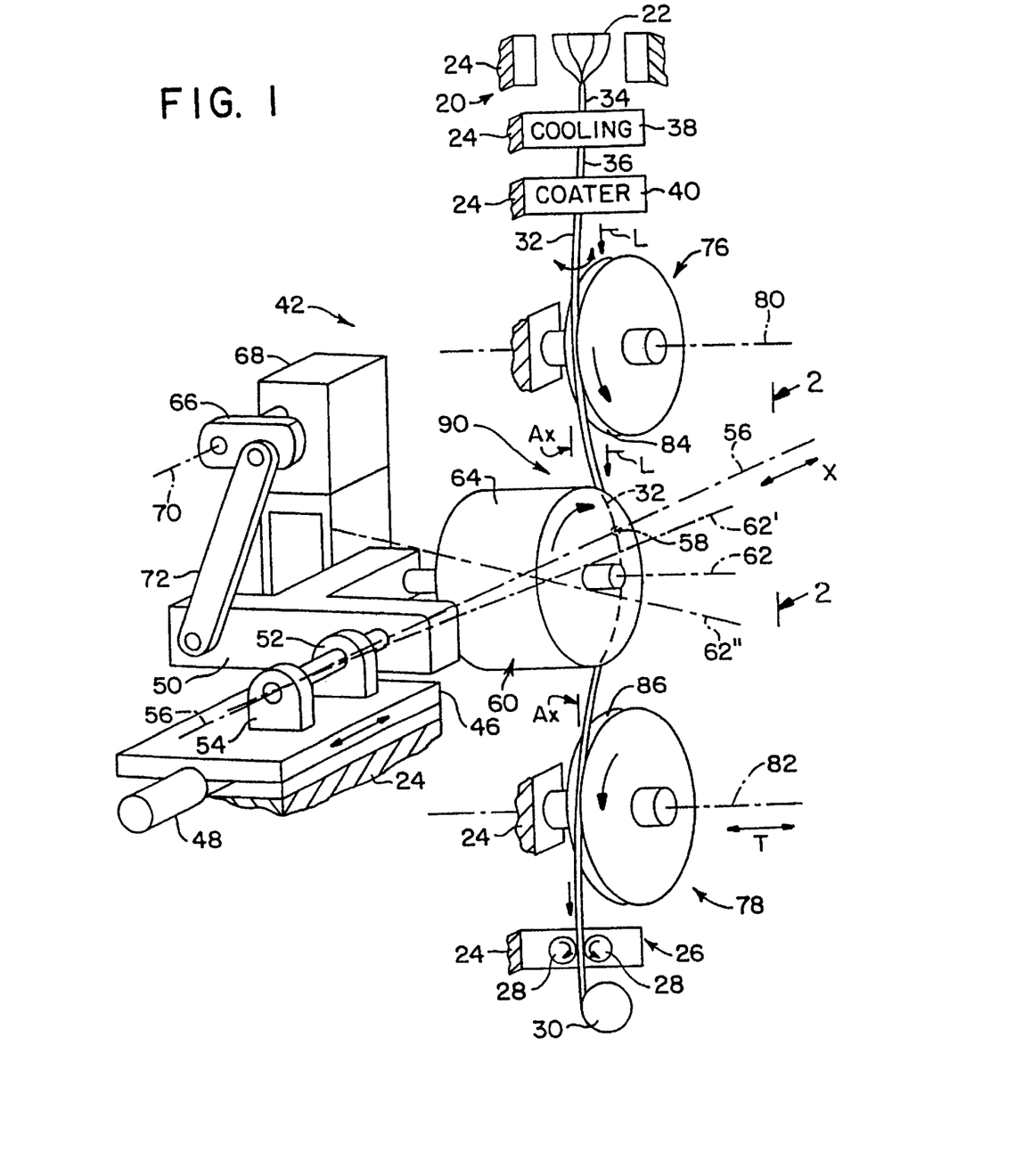
FIG. 1 is a diagrammatic, partially perspective view depicting apparatus in accordance with one embodiment of the invention.

Apparatus in accordance with one embodiment of the invention incorporates a furnace 20 adapted to hold a preform 22 of the type commonly utilized in optical fiber drawing procedures. Furnace 20 is mounted to a frame 24 which defines the fixed frame of reference of the drawing system. Frame 24, for example, may be the frame of a building or gantry in which the fiber drawing operation is conducted. Although small portions of the frame are illustrated, it should be appreciated that all portions of frame 24 are fixed relative to all other portions of the frame. A takeoff or pulling stand 26 having a pair of opposed draw rollers 28 is provided of furnace 20. Stand 26 includes conventional elements (not shown) such as electromechanical drive systems for turning rollers 28 about their axes so as to draw a fiber engaged therebetween. A takeup reel 30 is also provided. The takeup reel is also driven by conventional equipment (not shown) in rotation about an axis fixed relative to frame 24 so as to wind fiber from stand 26 onto the reel. Furnace 20 is arranged to maintain at least a portion of preform 22 in a soft, substantially molten condition. Stand 26 is arranged to pull a fiber 32 from the molten portion of preform 22 so that the fiber passes along a substantially predetermined path. The fiber path has a downstream longitudinal direction L directed along the length of the fiber. References to the longitudinal direction at a given point along the upstream to downstream extent of the path should be understood as referring to the direction along the path at that point. Thus, where the path is not straight, the longitudinal direction of the path may be oriented differently with respect to the frame 24 at different points along the length of the path.

In a melt zone 34 adjacent the upstream end of the path, the fiber is substantially molten. However, as the fiber moves downstream along the path, it is cooled and solidified so that when the fiber reaches a point 36 considerably downstream from furnace 20, the fiber has cooled to a substantially solid state. The region of the path extending from point 36 to the downstream end of the path is referred to herein as the "solid region" of the path. Cooling devices 38 may be provided between the melt zone and the solid zone. Typically, the cooling device includes a substantial length of frame 24 such that as the fiber traverses this length of the frame and the corresponding length along the path, the fiber cools by exposure to the atmosphere. Desirably, the cooling device provides non-contact cooling, such that no solid object touches the surface of the fiber while it cools.

A coating device 40 is also mounted to frame 24 in solid zone 36. The coating device is adapted to apply a polymeric coating on the outside of the fiber. Preferably, the coating device is also a non-contact device. That is, the fiber passes through coat 40 without contacting or engaging any other solid object. Suitable non-contact coaters are disclosed, for example, in U.S. Pat. No. 4,792,347. The foregoing elements of the apparatus may be of conventional design as commonly utilized in the optical fiber drawing art. The apparatus may further include additional guide rollers (not shown) adjacent to downstream end of path 32, for diverting the fiber and hence the path from a straight line and for further constraining the fiber in the path. Other conventional elements such as quality testing equipment and the like may also be included.

The apparatus further includes a spin-imparting assembly 42 disposed in the solid zone of the path. The spin-forming apparatus includes an adjustable carriage 46 slidably mounted to frame 24 for movement in cross-path directions X transverse to the longitudinal direction of path 32. A micrometer adjustment device 48 is provided for moving the carriage in the cross-path directions and for locking the carriage in place once the same has been adjusted to the desired location relative to frame 24. A yoke 50 is mounted to carriage 46 by a shaft 52 and bearings 54 so that yoke 50 is pivotable relative to carriage 46 and hence relative to frame 24 about a rocking axis 56 extending in the cross-path directions X and intersecting path 32 at a point of intersection 58.

Figures 2, 3:
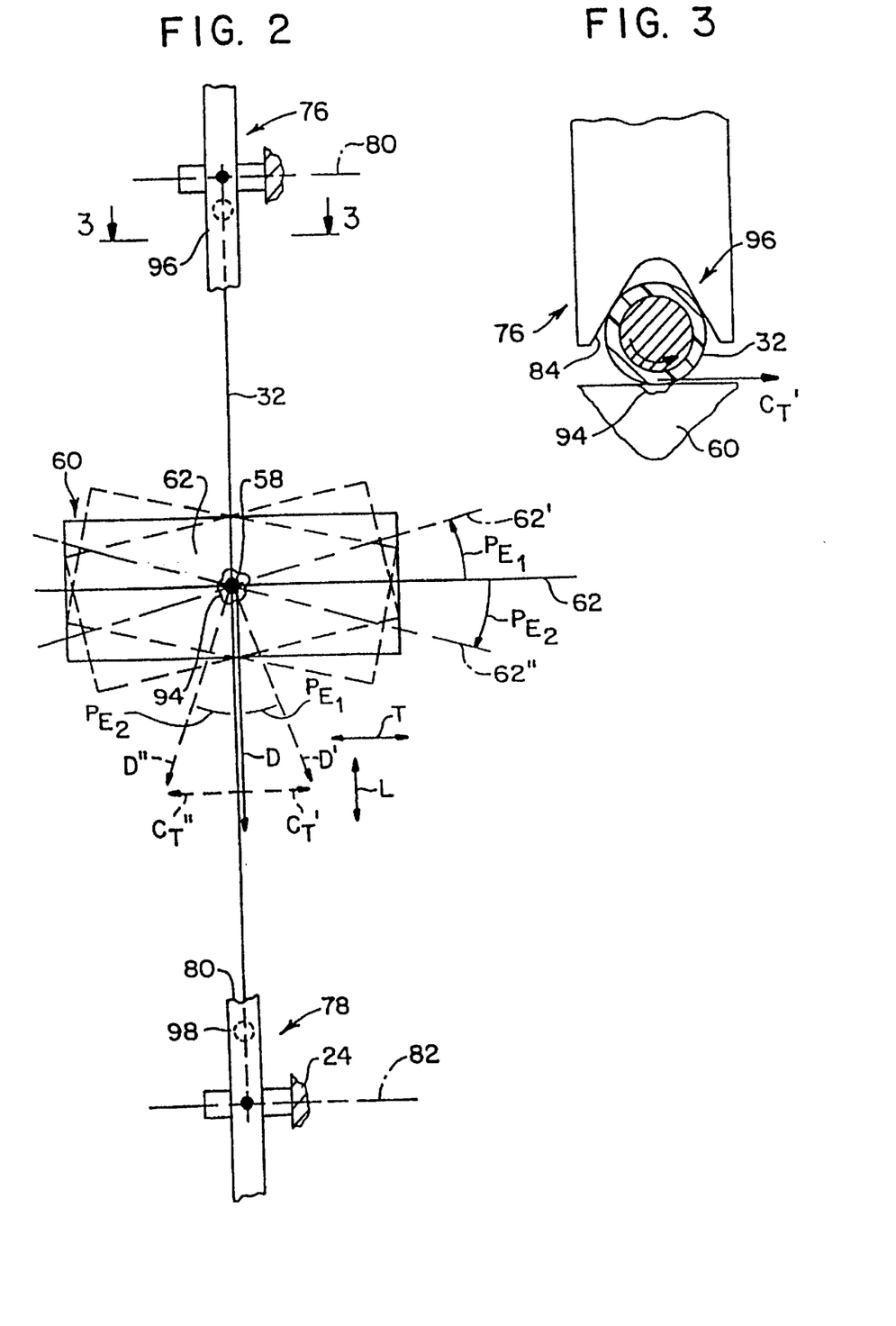
FIG. 2 is a fragmentary, diagrammatic elevational view along line 2—2 in FIG. 1.
FIG. 3 is a fragmentary sectional view taken along line 3—3 in FIG. 2.

Spin-imparting assembly 42 further includes a cylindrical first roller 60 mounted to yoke 50 for rotation about a first element axis 62. Roller 60 has a circumferential surface 64 encircling first element axis 62 and coaxial therewith. The frame of a motor 68 is mounted to carriage 46. A crank 66 is supported on the shaft of motor 68 so that the motor can turn crank 66 around an axis 70 parallel to the rocking axis 56. A connecting rod 72 has one end pivotally connected to crank 66 remote from its axis 70 and has the opposite end pivotally connected to yoke 50 remote from rocking axis 56. Thus, rotation of crank 66 about crank axis 70 will drive yoke 50 in a rocking motion about rocking axis 56 between a first extreme position in which the roller axis or first element axis 62 is tilted to the position indicated in broken lines at 62' in FIG. 1 and a second extreme position in which the roller axis or first element axis 62 is tilted in the opposite direction to the position shown in broken lines at 62" in FIG. 1. As best seen in FIG. 2, extreme positions 62' and 62" are disposed at equal but opposite extreme tilt angles E1 and E2 from a nominal position 62 in which the roller axis or first element axis is perpendicular to the longitudinal direction of path 32. In all positions of the roller including these extreme positions, however, the roller axis 62 remains generally transverse to the longitudinal direction of the path. Desirably, each extreme angle E is between about 2 and about 10 degrees from nominal position. As further discussed below, the desired angle depends upon the desired amount of spin to be imparted to the fiber. The angles E may be adjusted by adjusting the dimensions of crank 66 and particularly, the spacing between the pin joint of connecting rod 72 and axis 70. The speed of rotation of motor 68 determines the rate at which the yoke 50 and first element 60 will rock between the two extreme positions. Motor 68 may be an adjustable speed device such as a stepper motor driven by a digital control system of the conventional type, a DC motor driven by an adjustable voltage source, an air motor driven by an adjustable gas source, or any other conventional variable-speed motor. Alternatively, motor 68 may be fixed-speed device.

The spin-imparting assembly 42 further includes a second element incorporating an upstream roller 76 and a downstream roller 78. Roller 76 is mounted to frame 24 for rotation about an axis 80 perpendicular to the longitudinal direction path 32 and upstream from first element 60 whereas roller 78 is mounted to frame 24 downstream from first element 60 for rotation about an axis 82 parallel to axis 80 and also perpendicular to the longitudinal direction of path 32. Upstream roller 76 has a circumferential surface in the form of a surface of revolution about axis 80. The circumferential surface includes a generally V-shaped groove 84 aligned with path 32, so that the fiber passing along the path is received in the groove. Downstream roller 78 has a similar groove 86, also aligned with the fiber and path.

As best seen in FIG. 1, the upstream and downstream rollers 76 and 78 are spaced apart in the longitudinal direction of the path so that they define a gap 90 between them. First element or roller 60 is received in this gap. That is, the circumferential surface 64 of the first rotor extends slightly into the gap in the cross-path direction X. Fiber 32 and hence the path of the fiber bend in the cross-path direction through a cross-path deflection angle Ax at each of the upstream and downstream rollers and likewise bends around the first roller 60 in the cross-path direction. The cross-path deflection angle Ax desirably is in the range of about 1 to about 30 degrees, and preferably between about 5 and about 15 degrees. The cross-path deflection angle varies with the setting of carriage 46. The circumferential surfaces of the rollers desirably are formed from hard, wear resistant materials such as metals or ceramics. The fiber and the path are tangent to the first roller at the point of intersection 58 of rocking axis 56 and path 32. When the first roller 60 is in its nominal position, the first roller axis 62 is parallel to the axes 80 and 82 of the upstream and downstream rollers, and all of these axes extend in lateral directions T, perpendicular to the longitudinal direction L and perpendicular to the cross-path direction X.

In a process according to one embodiment of the invention, takeoff stand 26 is actuated to pull a fiber along path 32. In the conventional manner, the fiber is taken from preform 22 and elongates in melt region 34. Each portion of the fiber passes downstream along the path, cools in cooling region 38 and hence solidifies by the time it reaches point 36. Each region of the fiber is coated on its exterior surface with a polymeric coating as it passes through coater 40. Takeoff stand 26 maintains the entire fiber in tension. Because the path is bent in the cross-path direction at rollers 76, 60 and 78, the tension in the fiber has a component in the cross-path direction which tends to hold the fiber against the rollers. The rollers rotate about their own axes under the influence of the moving fiber. At the same time, the first roller 60 and the first roller element axis or first element axis 62 rock back and forth about rocking axis 56. As shown in FIGS. 2 and 3, at any instant, a portion 94 of the first roller surface 62 at the point of tangency of the fiber and the first roller, adjacent to intersection point 58, engages one side of fiber 32. Surface portions 96 and 98 of upstream and downstream rollers 76 and 78 of the second element contact the opposite side of the fiber. Because rollers 76 and 78 rotate about axes 80 and 82 fixed to frame 24, surface portions 96 and 98 of the second element or rollers 76 and 78 always move in a fixed direction relative to frame 24. Thus, surface portions 76 and 78 always move downstream in the longitudinal direction L of the path.

The instantaneous direction of motion of surface portion 94 on the first element varies with the angle of tilt of roller 60. When roller 60 is in its nominal position, with first roller axis 62 perpendicular to the longitudinal direction L, the direction of motion D of portion 94 is also parallel to the longitudinal direction L. However, when roller axis 62 is in the first extreme position 62' the instantaneous direction of motion of portion 94 is as indicated at D', oblique to the longitudinal direction. The instantaneous velocity of surface portion 94 relative to the frame of reference 24 thus includes a component Ct' in a lateral direction T perpendicular to the longitudinal direction L of the path and perpendicular to the cross-path direction. Again, the surface portions of the rollers 76 and 78 constituting the second element have no component of motion in the lateral direction. Thus, as best seen in FIG. 3, surface portion 94 has a lateral component of motion Ct' relative to surface portion 96 and also relative to surface portion 98 (FIG. 2). The fiber thus tends to roll about its axis. This rolling motion is transmitted up through the fiber to the melt region 34 and induces a spin in the fiber being formed in the melt region. The spinning motion occurs in a progressive, rolling motion of the fiber on the surface 62 of roller 60. The fiber desirably does not slide or jump along the roller surface. The forcible engagement between the roller surface and the fiber surface provided by tension in the fiber aids in maintaining this rolling motion.

As the roller tilts back through its nominal position, in which axis 62 is at the position indicated in solid lines in FIG. 2, the component Ct' gradually diminishes. As the roller swings towards the opposite extreme position, the component of motion of surface region 94 relative to the frame and relative to surface regions 96 and 98 in lateral direction T reverses direction. Thus, when the roller is tilted to the opposite extreme position 62" surface region 94 has a component of motion in the opposite lateral direction Ct". Thus, the component of motion of surface portion 94 with respect to surface portion 96 and 98 in the lateral direction T varies progressively from a maximum magnitude in one lateral direction to a maximum magnitude in the opposite lateral direction, so that the direction of rotation of the fiber about its axis is repeatedly reversed. Thus, the spin imparted to various portions of the fiber varies progressively from a maximum spin in one direction to a maximum spin in the opposite direction and back again. The variation can be expressed in units of rotation of the fiber about its axis per unit length along the fiber. The variation in spin per unit length imparted by this method is approximately sinusoidal. The period of the sinusoidal variation in spin along the length of the fiber is directly related to the ratio between the linear speed of the fiber passing through spin-imparting assembly 42 and the frequency of rocking the first element of roller 60 about rocking axis 56. The magnitude of the maximum spin and hence the magnitude of the sinusoidal variation and spin is related directly to the maximum tilt angle of the roller.

The spinning motion of the fiber is transmitted toward the upstream end of the path despite engagement of the fiber with roller 76. This result is surprising as the fiber would appear to be wedged in the V-shaped groove 84 and hence difficult to turn. Although the present invention is not limited by any theory of operation, it is believed that the downstream movement of the fiber facilitates rotation of the fiber with respect to roller 76 despite engagement of the fiber in the V-shaped groove 84 on the roller surface. To facilitate transmission of the spinning motion to the upstream end of the path, the portion of the path upstream from the spinning device 42 to the melt zone 34 should be free of elements which engage the surface of the fiber. That is, this portion of the path should be free of rollers and the like engaging the fiber surface. Preferably, the path between melt zone 34 and spin-imparting assembly 42 is substantially straight.

The fiber rotation is also transmitted downstream, past downstream roller 78 into the portion of the fiber extending between the downstream roller and the stand 26 and takeup roller 30. Because the stand and takeup roller do not rotate about the axis of the fiber, the spinning motion of the fiber would tend to impart an elastic twist to the fiber in this region of the apparatus. However, because the spinning motion is periodically reversed, the fiber passes into the stand and takeup reel with essentially zero twist. The length of the path between the downstream roller and the takeup reel should be longer than the period of variation in spin along the length of the fiber so that elastic twist in the downstream portion of the fiber can be completely relaxed before that portion of the fiber is wound onto the takeup reel.

Figure 4:
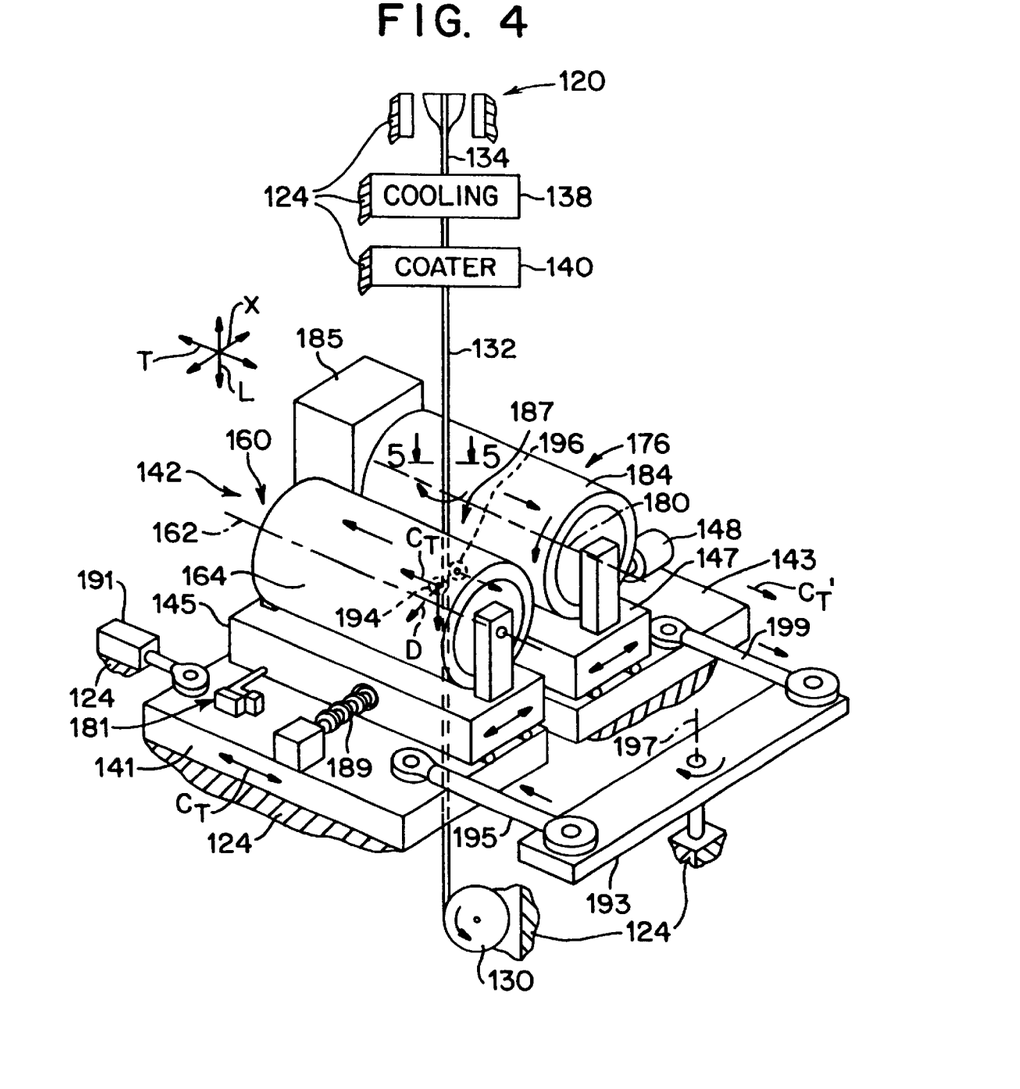
FIG. 4 is a diagrammatic, partially perspective view depicting apparatus in accordance with a further embodiment of the invention.

Apparatus in accordance with a further embodiment of the invention includes a furnace 120, frame 124, cooling region or apparatus 138, and coater 140 similar to the corresponding elements of the apparatus discussed above with reference to FIG. 1. This apparatus further includes a takeup reel 130 similar to that described above and associated drive elements (not shown) for driving the takeup reel. In this apparatus as well, the fiber is arranged to pass along a predetermined path 132. The spin-imparting assembly 142 includes a pair of mounts 141 and 143 each mounted to the frame 124 for sliding movement in lateral directions T perpendicular to the longitudinal direction L of fiber path 132. A first element carriage 145 is slidably mounted to mount 141 for movement relative to mount 141 in the cross-path direction X perpendicular to the longitudinal and lateral directions. A similar carriage 147 is slidably mounted to mount 143 for movement in the cross-path directions. A first element or roller 160 has a first element axis 162 and a cylindrical circumferential surface 164 encircling the first element axis. Roller 160 is rotatably mounted on first element carriage 145 so that the first element axis 162 extends substantially in the lateral directions. The first element or roller 160 has a soft, resilient coating such as rubber of about 30 to about 50 Shore A Durometer about 0.1 mm to about 10 mm thick on a cylindrical body of a rigid material such as a metal. A second element or second roller 176 has a second element axis 180 and a similar soft, resilient cylindrical circumferential surface 184 encircling axis 180. The second element is rotatably mounted on second element carriage 147 so that axis 180 also extends in the lateral directions, substantially parallel to first element axis 162. A drive motor 185 is connected to second element or roller 176 and is arranged to rotate the second element about axis 180 at a substantially constant rotational velocity.

Rollers 162 and 176 are arranged at the same point along the longitudinal extent of path 132, on opposite sides of the path, so that the rollers define a nip 187 therebetween. A micrometer adjustment and locking device 148 are provided for controlling the position of second carriage 147 and hence second roller 176 in the cross-path directions X. First element carriage 145 and first roller 160 are biased by a spring 189 in the cross-path direction toward the second roller. An adjustable stop 181 limits movement of the first element carriage 145 in the cross-path direction. This stop assures that the distance between rollers 160 and 176 will always be at least equal to a predetermined minimum, and thus assures that the rollers will not crush the fiber. If the diameter of the fiber is slightly greater than this predetermined minimum distance, the carriage will remain engaged with the stop. The resilient circumferential surfaces 164 and 184 of the rollers will compress slightly, and the fiber will be forcibly engaged with both circumferential surfaces. If the fiber diameter substantially exceeds the predetermined minimum, first roller 160 and first element carriage 145 will move in the cross-path direction away from second roller 176 against the bias of spring 189. In either case, a fiber extending along path 132 between the rollers will be engaged forcibly between the rollers at nip 187.

An oscillation drive unit 191 mounted to frame 124 is linked to first mount 141. The oscillation drive unit is adapted to move the first mount in the lateral directions T relative to frame 124. The oscillation drive unit may include a crank mechanism as discussed above with reference to FIG. 1 together with a drive motor, or else may include any conventional linear actuator such as a screw or rack and pinion actuator, a hydraulic or pneumatic cylinder with conventional pressurization and control circuitry or any other conventional actuator. A pivot link 193 is mounted to frame 124 for pivoting movement about an axis 197 extending parallel to the longitudinal direction of the path. Pivot link 193 is connected by a first rod 195 to the first mount 141. The opposite end of pivot link 193 on the other side of axis 197 is connected by a second rod 199 to the second mount 143. Link 193 and rods 195 and 199 are connected to one another, and to mounts 141 and 143 by conventional pivotable pin joints. The links are arranged so that as the first element undercarriage 141 moves one way in a lateral direction T, second element undercarriage 143 moves in the opposite lateral direction at equal speed.

Figure 5:
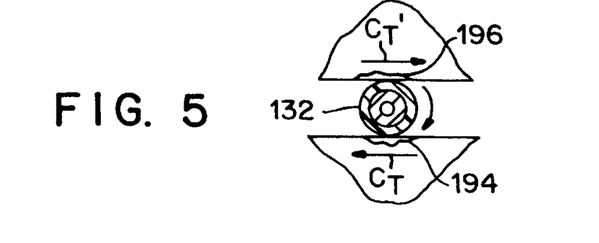
FIG. 5 is a fragmentary sectional view taken along line 5—5 in FIG. 4.

In a process utilizing this apparatus, the fiber 132 is engaged between the rollers 160 and 176 at the nip 187. Motor 185 is actuated to turn roller 176 and pull the fiber in the downstream longitudinal direction. The bias applied by spring 189 forces the first element carriage 145 towards the opposite carriage 147 and hence forces the first element or roller 160 into engagement with the fiber and forces the fiber into engagement with the opposite, second element or roller 176. Linear drive 191 is actuated to move the first mount 141, first element carriage 145 and hence the first element or roller 160 in an oscillating, back-and-forth motion, first in one lateral direction and then in the opposite lateral direction. In the condition illustrated, the first mount 141 and roller 160 are moving with lateral velocity Ct, whereas the second mount 143 and element 176 are moving with an equal but oppositely directed lateral velocity Ct'. The surface regions 194 and 196 of the rollers at the nip which are momentarily engaged with the fiber are likewise moving with equal but opposite lateral components of velocity. Both surface regions are also moving downstream due to the rotational movement of the rollers about their respective axes. Thus, the surface regions of the rollers in engagement with the fiber are moving in directions oblique to the longitudinal direction of the path, but with oppositely directed lateral components of velocity. As best appreciated with respect to FIG. 5, the opposite lateral components of velocity of surface regions 194 and 196 cause fiber 134 to spin about its axis. As the fiber is pulled through nip 187 by rotation of roller 176, the fiber is spun about its axis and here again this spin is transmitted upstream to melt zone 134. Actuator 191 gradually reverses the direction of mount 141, thus reversing the directions of the lateral components of motion of surface regions 194 and 196 relative to one another and reversing the direction of fiber spin. In the apparatus of FIGS. 4 and 5, the rollers and motor of the spin-imparting assembly 142 act as the takeup stand and draw the fiber through the apparatus. Thus, a separate takeup stand is not required.

Apparatus according to yet another embodiment of the invention includes a furnace 220, frame 224, cooling and coating regions 238 and 240, stand 226 and takeup reel 230 similar to the components described above with reference to FIG. 1. This further includes a spin-imparting assembly 242 incorporating a first element or roller 260 mounted on a yoke 250. The axis 262 of first roller 260 extends generally transversely to the longitudinal direction L of the fiber path 232. Yoke 250 is pivotally mounted on frame 224, as by a shaft 252 partially depicted in FIG. 6. Yoke 250 is pivotable with respect to the frame about rocking axis 256 extending in the cross-path direction, into and out of the plane of the drawing in FIG. 6. A second cylindrical roller 276 having a second roller access 280 is rotatably mounted on a yoke 281. Yoke 281 is also pivotable with respect to frame 224 about rocking axis 256. Rollers 260 and 276 are arranged to form a nip at rocking axis 256 so that the fiber is engaged in the nip. As discussed above with reference to FIGS. 4 and 5, the rollers may be biased toward one another in the cross-path direction to firmly engage their surfaces with the fiber.

Yokes 281 and 250 are connected by pin jointed connecting rods 283 and 285 to a common link 287. Common link 287 in turn is driven in reciprocating motion by drive unit 291. The links are arranged so that as common link 287 moves, the yokes 281 and 250 swing about rocking axis 256 in oppositely directed pivoting movement. In the position depicted in FIG. 6, each roller is at one extreme of its rocking movement. At the other extreme, the rollers are tilted in the opposite directions from those illustrated in FIG. 6. The rocking movement of each roller is similar to the rocking movement of roller 60 discussed above with reference to FIG. 1.

Figure 6:
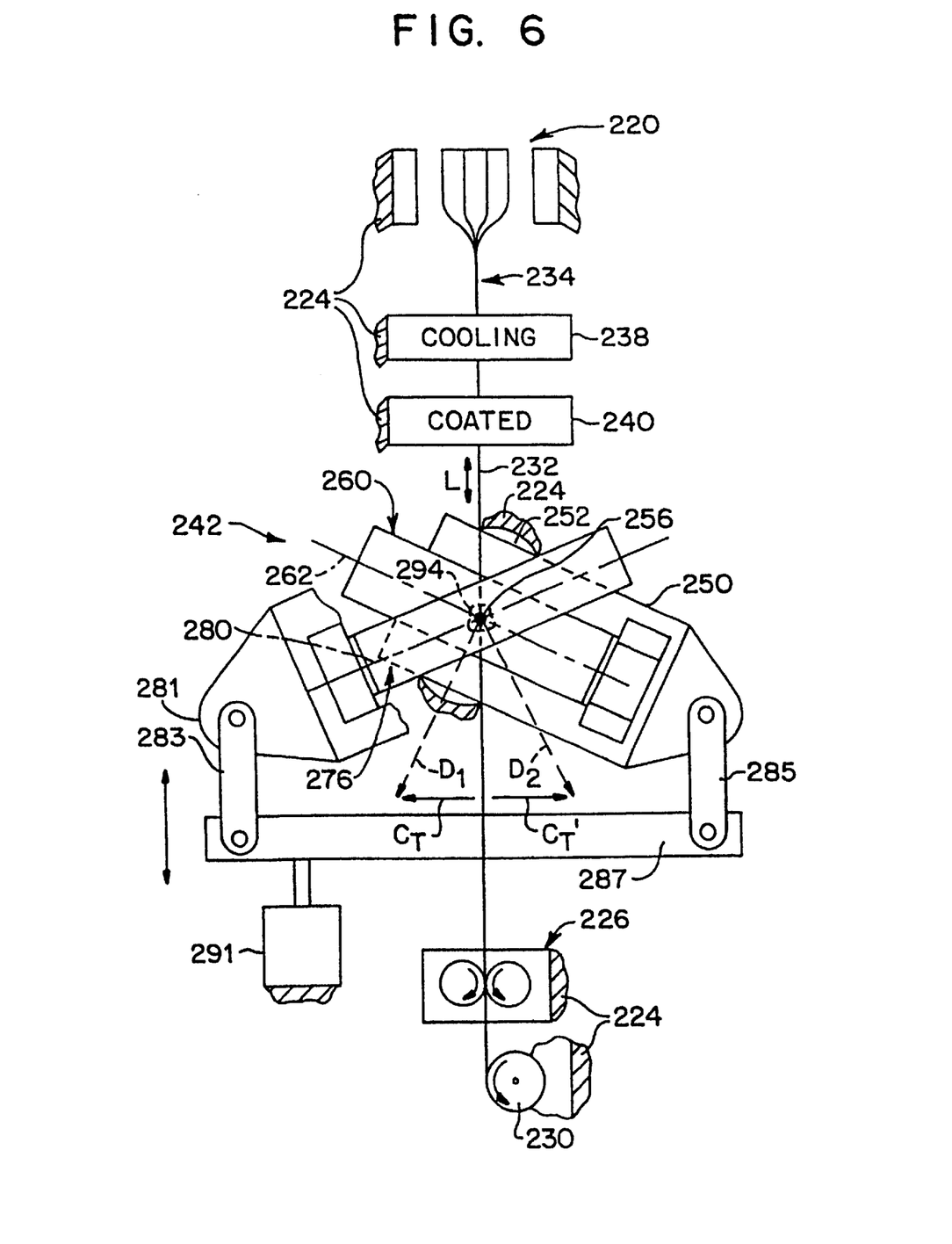
FIG. 6 is a diagrammatic elevational view depicting portions of apparatus in accordance with yet another embodiment of the invention, with portions of the apparatus removed for clarity of illustration.

The direction of movement of the surface region 294 on roller 260 in engagement with the fiber is always perpendicular to the first roller axis 262. In the position depicted, the direction of movement D of surface region 294 on first roller 260 is oblique to the longitudinal direction of the path and has a component of movement Ct directed to the left as seen in FIG. 6. The surface region on second roller 276 engaged with the fiber is moving with velocity D2, perpendicular to axis 280 and with component Ct in the opposite lateral direction. As in the arrangement of FIGS. 4 and 5, the oppositely directed lateral movement components cause the fiber to twist about its axis. As the yokes 250 and 281 pivot about rocking axis 256, the directions of lateral movement of the surface regions reverse and hence the spin also reverses. Because the components of lateral movement of the surface regions relative to frame 224 are equal and opposite, the lateral movement of the surface regions does not tend to displace the fiber in the lateral directions.

In this arrangement as well, the spinning movement imparted by the rollers induces a permanent spin in the fiber regions passing through the melt zone 234. Here again, because the direction of spin is repeatedly reversed, the spinning movement does not impart a permanent elastic twist to the fiber downstream from spin-imparting assembly 242. The longitudinal frequency of spin imparted by the apparatus of FIG. 6 can be calculated directly from parameters of the system as follows:

$$\Omega = \frac{\sin\theta}{a}$$

Where:
Ω is the spin rate expressed in units of angular rotation of the fast-axis direction per unit length along the length of the fiber;
Ω is the angle between each roller axis 262 and 280 and the perpendicular to the longitudinal direction; and
a is the radius of the fiber.

Figure 7:
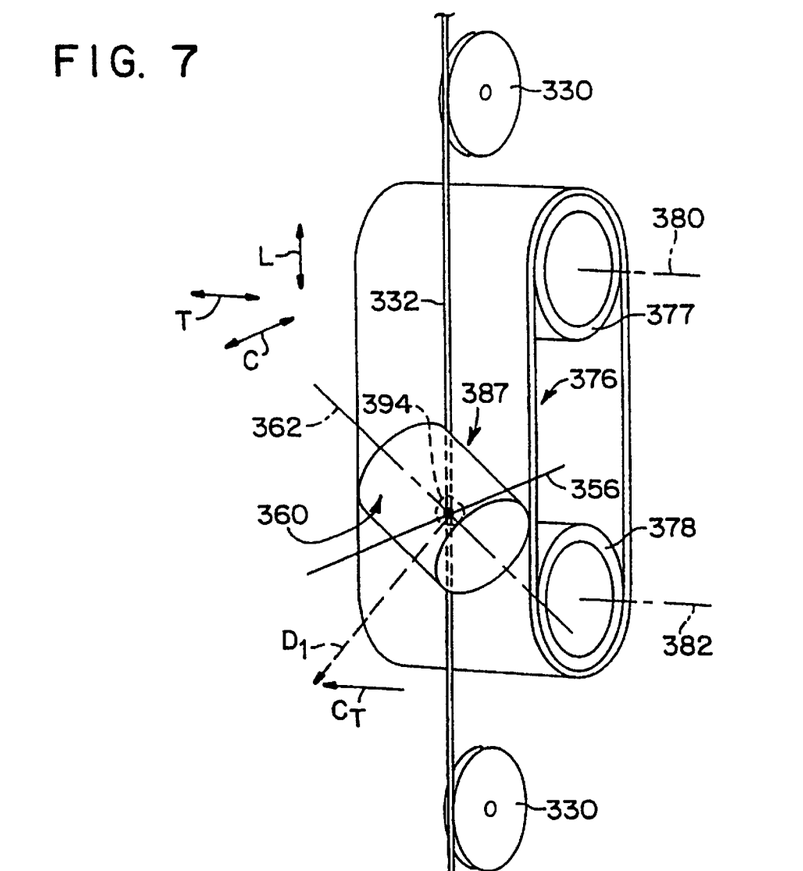
FIG. 7 is a fragmentary, diagrammatic perspective view depicting apparatus in accordance with a further embodiment of the invention.

Apparatus according to a further embodiment of the invention is schematically depicted in FIG. 7. In this arrangement, the first element includes a roller 360 mounted on a yoke (not shown) for rotation about the roller axis 362 and for rocking motion about a rocking axis 356 extending in the cross-path directions X. The second element is a belt 376 carried on a pair of cylindrical pulleys 377, 378 which in turn are mounted to the frame for rotation about axes 380, 382 fixed relative to the frame. The roller and belt are biased towards one another in the cross-path directions X and define a nip 387 therebetween, so that a fiber 332 passing along the path will be engaged between the surfaces of the roller and belt at the nip. In this arrangement as well, the surface region 394 of roller or first element 360 engaged with fiber 332 moves in direction D1 perpendicular to axis 362. Thus, as the axis 362 rocks about rocking axis 356, the lateral component of motion of surface region 394 falls to zero and then reverses direction in the same manner as described above. The direction of movement of the surface regions on belt 376 is always parallel to the longitudinal direction. In the same manner as discussed above, the relative motion of the surface regions engaging the fiber in opposite lateral directions relative to one another causes the fiber to spin about its axis. In the arrangement of FIG. 7, the motion of roller 360 tends to sweep the fiber laterally. This lateral motion of the fiber can be tolerated, in as much as it reverses direction when the roller axis is tilted in the opposite direction. However, to prevent transmission of this lateral motion upstream and downstream along the fiber, a pair or grooved constraining rollers 330 may be provided upstream and downstream from the nip. These rollers are mounted for rotation around axes fixed with respect to the frame.

Figure 8:
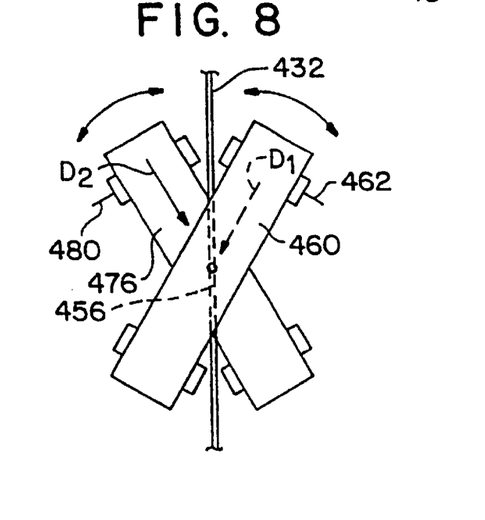
FIG. 8 is a fragmentary, diagrammatic elevational view depicting portions of apparatus in accordance with yet another embodiment.

In apparatus according to a further embodiment of the invention, the first element 460 and the second element 476 are both belts. Each belt is mounted on a pair of pulleys. The belts are disposed on opposite sides of fiber path 432, so that runs of the belts confront one another and define a nip between them. The pulleys associated with the two belts are mounted to the frame (not shown) for rocking motion about a rocking axis 456 extending into and out of the plane of the drawing in FIG. 8. Thus, in the position illustrated, the confronting runs of the belts move with velocities D1 and D2 directed oblique to the longitudinal direction of the fiber path. Each belt moves in directions perpendicular to the axes of its respective pulleys. For example, belt 460 moves in directions perpendicular to axis 462 of a pulley associated with that belt, whereas belt 476 moves in directions perpendicular to its associated pulley axis 480. As the belts and pulleys rock, the directions of the pulley axes, and hence the directions of the confronting belt runs swing around the rocking axis. Here again, the confronting surface portions of the belts or elements 460 and 476 move in opposite lateral directions relative to the frame and hence move in opposite lateral directions relative to one another so as to spin the fiber about its axis. Once again, as the elements and axes tilt or rock around axis 456, the directions of lateral movement of the elements relative to one another reverse and hence the directional spin imparted to the fiber also reverses. As will be readily appreciated, numerous variations and combinations of the features described above can be utilized without departing from the invention as defined by the claims. Merely by way of example, the crank arrangement illustrated in FIG. 1 can be replaced by any other suitable device capable of providing a controlled rocking motion to rocker 50. For example, electrical, hydraulic and even pneumatic actuators can be employed to impart the rocking motion. Similarly, the particular linear drive 191 utilized in the arrangement of FIG. 4 can be replaced by other actuating devices. The linkage utilized in FIG. 4 to assure equal but opposite linear velocities can be omitted, and each mount 141, 143 can be provided with an independent linear drive. These linear drives can be controlled to provide equal but opposite velocities. Alternatively, the rollers can be translated with unequal velocities. During such unequal translation movement, the fiber will tend to wander slightly in the lateral direction along the surfaces of the rollers. Likewise, independent drives can be used to drive the rockers 250, 281 of FIG. 6 independently. In the arrangements discussed above, the drives are operated gradually, so as to gradually reverse the relative lateral movement of the surface regions in contact with the fiber and thereby gradually reverse the spin imparted to the fiber in a substantially periodic, preferably sinusoidal fashion. However, other patterns of variation in the lateral velocities of the surface regions can be employed. For example, the relative lateral velocities can be brought to a first value and maintained at that value as, for example, by maintaining constant tilt angles by roller 60 or of the two rollers depicted in FIG. 6, or by maintaining a constant translational velocity of each roller 160, 176 in FIG. 4 for a prolonged period. This will impart a substantially constant spin to the fiber during such period. The relative lateral velocities are then reversed and the opposite spin may be imparted to the fiber. Conversely, the spin in the fiber can be varied rapidly, in an impulse-like manner.

Essentially any amount of spin per unit length, and any pattern of variation in the magnitude and direction of spin over the length of the fiber desired for optical performance can be imparted by methods and apparatus according to the invention. Desirably, the apparatus is designed for minimum inertial resistance to movement of the components which must move to change the spin rate. For example, to achieve a change in spin rate, the translating rollers and the associated carriages of the embodiment depicted in FIG. 4 must be accelerated. These components should have the lowest possible mass. Particularly preferred patterns of variation in spin per unit length are disclosed in the copending, commonly assigned U.S. Provisional Patent Application Serial No. 60/010376 filed Jan. 22, 1996, entitled Frequency and Amplitude Modulated Fiber Spins for PMD Reduction and naming as inventors D. Henderson, Ming-Jun Li, D. Nolan and G. Washburn ("the '376 application") the disclosure of which is hereby incorporated by reference herein. A copy of the '376 provisional application is appended to the present provisional application as appendix A. As disclosed in the aforesaid '376 application, the spin varies between extremes of opposite direction according to a periodic function such as a sinusoidal function, and the periodic function is modulated (varied) along the length of the fiber so that. For example, the amplitude of the periodic function, the frequency of the periodic function or both may vary along the length of the fiber.

Moreover, the spin-imparting apparatus can be controlled with reference to the actual fiber drawing speed and/or actual fiber diameter as disclosed in the copending, commonly assigned U.S. Provisional Patent Application Serial No. 60/012290 filed Feb. 26, 1996, entitled Method and Apparatus for Providing Controlled Spin in Optical Fiber and naming as inventor Robert M. Hawk ("the '290 application") the disclosure of which is hereby incorporated by reference herein. A copy of the '290 application is appended hereto as Appendix B. As described therein, the actual draw speed and actual fiber diameter are measured and the angular position of a fiber-engaging element such as a roller in a spin-imparting apparatus is set to the angle which will provide the desired instantaneous spin rate based on the actual draw speed and actual fiber diameter.

According to further variants, the spring 189 (FIG. 4) used to bias the rollers toward one another may be replaced by any other suitable bias device such as a pneumatic, electrical or weight-operated device. Where the rollers or belts defining a nip have some resilience, these rollers or belts can be mounted at fixed distance from one another, so that the fiber is forcibly engaged with the surfaces of the nip defining elements. Also, in embodiments using a rocking roller or belt to form one or both elements of a nip, the rocking roller or belt can be forcibly driven in the same way as roller 176 (FIG. 4) so that the rocking roller and the opposite nip-defining element form the takeup stand and pull the fiber through the apparatus. Also, the invention can be applied in processes other than pulling from a preform. For example, a preexisting fiber can be momentarily softened in a melt zone and spun in the same manner.

Figure 9:
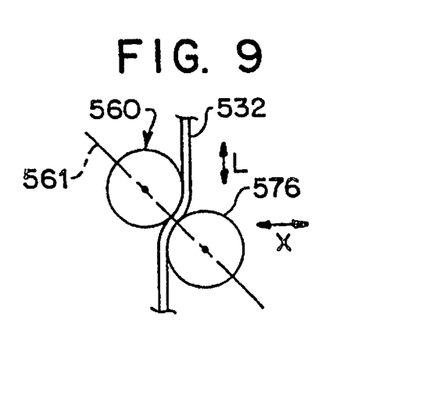
FIG. 9 is a fragmentary, diagrammatic elevational view depicting portions of apparatus in accordance with a further embodiment.

Apparatus according to a further embodiment (FIG. 9) incorporates a first roller 560 and second roller 576 similar to the opposed rollers discussed above with reference to FIG. 4. However, rollers 576 and 560 are offset from one another in the general longitudinal direction L of the fiber path 532 (the longitudinal direction in those sections of the path upstream and downstream from the rollers). Thus, a plane 561 extending between the axes of the rollers is oblique to the general longitudinal direction of the fiber path. The fiber path bends in the cross-path direction X at each roller, so that the fiber wraps partially around each roller 560 and 576. In other respects, the apparatus is similar to that described above with reference to FIG. 4. For a given amount of translational movement of the rollers, the apparatus incorporating offset rollers as illustrated in FIG. 9 typically can provide a greater degree of spin per unit length than apparatus as illustrated in FIG. 4. However, the degree of spin per unit length imparted by the apparatus of FIG. 9 is less predictable than the degree of spin per unit length imparted by the apparatus of FIG. 4.

Constraining rollers similar to rollers 330 (FIG. 7) can be utilized in spin-imparting assemblies according to the other illustrated embodiments, to limit lateral movement of the fiber. For example, such constraining rollers can be positioned upstream and downstream from the rollers depicted in FIG. 4, or upstream and downstream from the rollers depicted in FIG. 6. According to yet another embodiment of the invention, the apparatus of FIG. 1 may be modified to replace the rocking motion of first element or roller 60 with translational movement. Thus, the first element or roller axis 62 may remain perpendicular to the longitudinal direction of the path, and roller 60 may be move back and forth in the lateral directions in a manner similar to the movement of roller 160 in FIG. 4.

As these and other variations and combinations of the features described above can be utilized without departing from the present invention, the foregoing description of the preferred embodiments should be taken by way of illustration rather than by way of limitation of the invention as defined by the claims.

What is claimed is:

1. Optical fiber drawing apparatus comprising:
    (a) a structure defining a melt zone and a solid zone remote from said melt zone;
    (b) means for drawing a fiber along a predetermined path in a downstream longitudinal direction relative to said structure so that the fiber is substantially molten in said melt zone and solidifies during drawing before reaching said solid zone;
    (c) a pair of opposed rollers disposed on opposite sides of the path and defining a nip in said solid zone, each of said rollers having a roller axis transverse to the longitudinal direction and a circumferential surface encircling the roller axis, each said roller being rotatable about its roller axis;
    (d) means for supporting said rollers on said structure and moving said rollers relative to one another in opposite lateral directions transverse to the longitudinal direction at least some times during operation of said drawing means; and
    (e) means for forcibly engaging said circumferential surfaces of said rollers with a fiber drawn along said path by said fiber drawing means, whereby rotation of said rollers about said roller axes will cause the fiber to twist.

2. Apparatus as claimed in claim 1 wherein said means for supporting and moving is operative to move both of said rollers simultaneously relative to the structure in opposite lateral directions.

3. Apparatus as claimed in claim 1 wherein at least one of said rollers has a resilient layer defining its circumferential surface and wherein said means for forcibly engaging includes said resilient layer.

4. An optical fiber drawing apparatus comprising:
    (a) a structure defining a melt zone and a solid zone remote from said melt zone;
    (b) means for drawing a fiber along a predetermined path in a downstream longitudinal direction relative to said structure so that the fiber is substantially molten in said melt zone and solidifies during drawing before reaching said solid zone;
    (c) a pair of opposed rollers disposed on opposite sides of the path and defining a nip in said solid zone, each of said rollers having a roller axis transverse to the longitudinal direction and a circumferential surface encircling the roller axis, each said roller being rotatable about its roller axis;
    (d) means for supporting said rollers on said structure and moving said rollers relative to one another in opposite lateral directions transverse to the longitudinal direction at least some times during operation of said drawing means;
    (e) means for engaging said circumferential surfaces of said rollers with a fiber drawn along said path by said fiber drawing means, whereby rotation of said rollers about said axes will cause the fiber to twist; and
    (f) an assembly attached to said means for supporting and moving said rollers to prevent crushing of the fiber.

5. The apparatus of claim 4 wherein said assembly includes a micrometer adjustment and locking device attached to said means for supporting and moving said rollers.

6. The apparatus of claim 4 wherein said assembly includes an adjustable stop and a spring attached to said means for supporting and moving said rollers.

7. An optical fiber drawing apparatus, comprising:
    (a) a furnace adapted to hold and melt a preform from which a fiber is drawn along a predetermined path in a longitudinal direction; the fiber being substantially molten within a melt zone of the furnace and is solidified along the path;
    (b) a pair of opposed rollers between which the fiber passes disposed on opposite sides of the path, the fiber being engaged by the rollers, each of the rollers having a roller axis transverse to the longitudinal direction and being rotatable about its roller axis; and (c) mounts supporting and moving the rollers relative to one another in opposite lateral directions transverse to the longitudinal direction at selected times during fiber draw thereby imparting spin to the fiber.

8. The apparatus of claim 7 wherein the mounts are coupled to the rollers through carriages which are adapted to slidably move in a cross path direction perpendicular to the lateral directions.

9. The apparatus of claim 8 wherein a position of one of the rollers is controlled in the cross path direction.

10. The apparatus of claim 9 wherein a position is controlled by an adjustment and locking device.

11. The apparatus of claim 8 wherein one of the rollers is biased by a spring in the cross path direction.

12. The apparatus of claim 7 further comprising a stop for assuring a distance between the rollers will be at least equal to a predetermined minimum.

13. The apparatus of claim 12 wherein the stop is adjustable.

14. The apparatus of claim 7 further comprising a resilient cylindrical circumferential surface on the rollers.

15. The apparatus of claim 7 further comprising a driver motor engaging and rotating one of the rollers.

16. The apparatus of claim 7 further comprising an assembly that prevents the fiber from being crushed.

* * * * *